United States Patent [19]

Kitai et al.

[11] Patent Number: 4,674,867
[45] Date of Patent: Jun. 23, 1987

[54] PHOTOGRAPHIC CONTACT PRINTING APPARATUS FOR DUPLICATING OF ORIGINAL COLOR PICTURE

[75] Inventors: Makoto Kitai; Takashi Omori, both of Kyoto, Japan

[73] Assignees: Kabushiki Kaisha Shashin Kogyo; Dainippon Screen Mfg. Co., both of Kyoto, Japan

[21] Appl. No.: 690,756

[22] Filed: Jan. 11, 1985

[30] Foreign Application Priority Data

Jan. 17, 1984 [JP] Japan .................................. 59-4717
Jan. 18, 1984 [JP] Japan .................................. 59-5810
Jan. 20, 1984 [JP] Japan .............................. 59-5176[U]
Jan. 24, 1984 [JP] Japan .................................. 59-9532
Jan. 24, 1984 [JP] Japan .................................. 59-9531

[51] Int. Cl.⁴ .......................................... G03B 27/02
[52] U.S. Cl. ................................. 355/78; 355/76; 355/97; 353/27 R; 271/90
[58] Field of Search ................. 355/78, 97, 99, 76, 355/122; 353/27 R, 27 A; 271/90

[56] References Cited

U.S. PATENT DOCUMENTS

| | | | |
|---|---|---|---|
| 3,771,870 | 11/1973 | Taylor | 355/76 |
| 4,049,342 | 9/1977 | Hearon | 353/27 R |
| 4,178,097 | 12/1979 | Sara | 355/132 |
| 4,389,117 | 6/1983 | Floyd et al. | 355/99 |
| 4,451,144 | 5/1984 | Gensike | 355/99 |

*Primary Examiner*—Monroe H. Hayes
*Attorney, Agent, or Firm*—Lackenbach Siegel Marzullo & Aronson

[57] ABSTRACT

A photographic contact printing apparatus for duplicating original color picture films that can be operated in a lightroom, and that can expose the necessary number of photosensitive materials sequentially by closely contacting each of them with respective original picture films set up at an exposure position with a predetermined sequence according to commands of control means which are previously established by exposure conditions.

2 Claims, 25 Drawing Figures

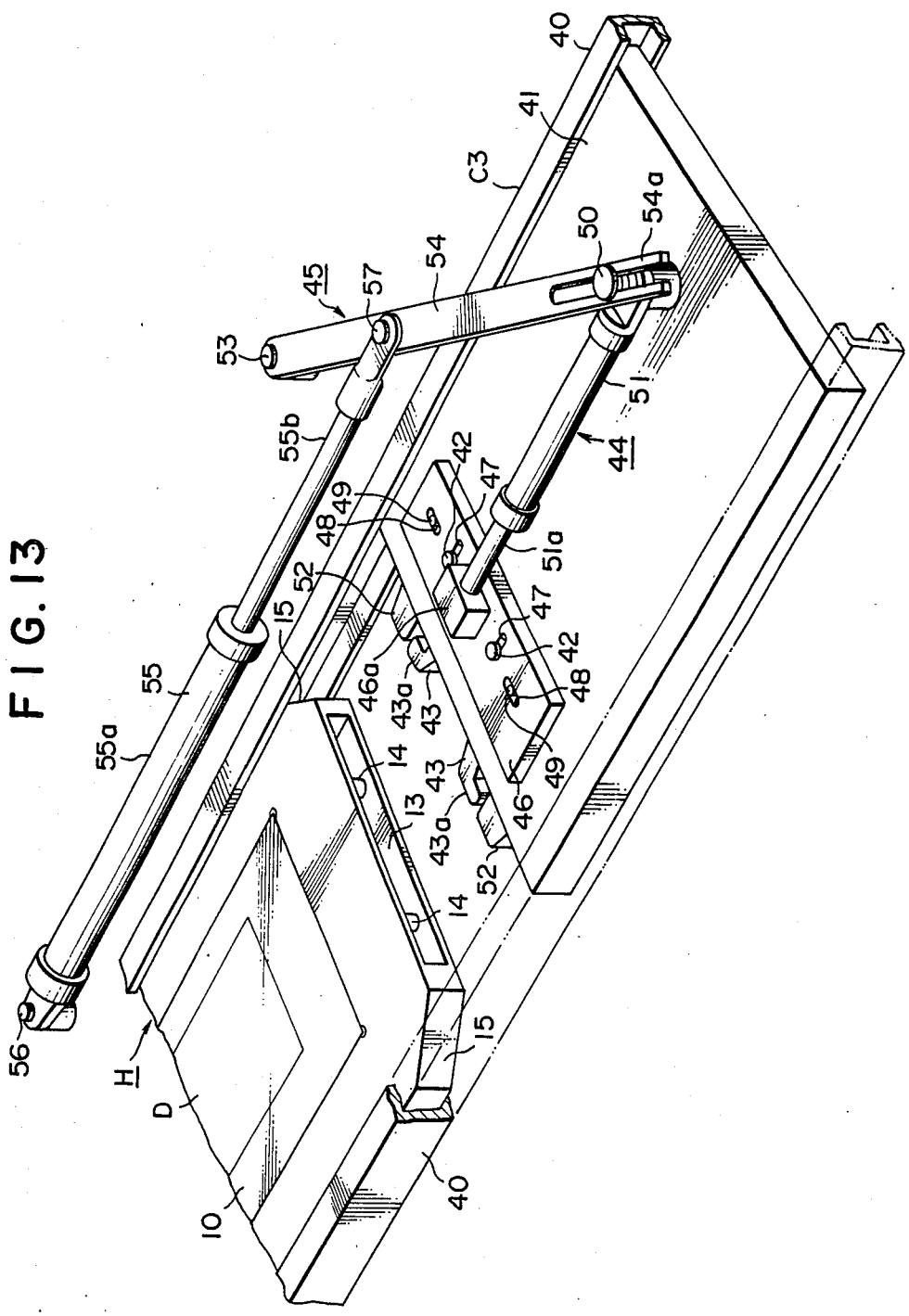

PHOTOGRAPHIC CONTACT PRINTING APPARATUS FOR DUPLICATING OF ORIGINAL COLOR PICTURE

BACKGROUND OF THE INVENTION

The present invention relates to a photographic contact printing apparatus, particularly to an apparatus for reproducing original color films. Films on which the original picture of pictures are reproduced are manufactured for applying to working copies, etc. for the use of sliding films for a projector and reproduction prints and the like.

PRIOR ART

Conventional color film reproducing work has been carried out in a darkroom by using a photographic enlarger provided with the usual type of color head. However, there are disadvantages in this method as follows: a low working efficiency and a necessity of setting up appropriate exposure conditions according to the color tone of the original pictures; density conditions relating to the characteristic of color density of material to be duplicated to obtain a good quality of reproduced picture images; and a high proficiency requirement for the operator to obtain good results. Besides, there are other disadvantages, namely, when the contact pressure between the original picture film and a photosensitive material is low, sharpness in the reproduced picture is lacking, and if the contact is too great, the sensitive material quality of the reproduced picture images deteriorates because of a Newton ring generated between the original film and the photosensitive material.

SUMMARY OF THE INVENTION

Therefore, it is the first object of the present invention to provide a photographic contact printing apparatus which can be operated in a light room.

It is the second object of the present invention to provide a photographic contact printing apparatus which can automatically perform all operations sequentially, after setting up exposure conditions and loading original color film or films and a photosensitive material.

The third object of the present invention is to provide an automated photographic contact printing apparatus in which a plurality of original color pictures are previously loaded in the apparatus and each of the original picture films is set at predetermined exposure positions in predetermined sequence according to the instructions of a control means, and the required number of photosensitive materials are closely contacted to the original color films sequentially.

The fourth object of the present invention is to provide a photographic contact printing apparatus which can expose duplicated pictures excellent in sharpness at a soft contact state at which a Newton ring does not generate.

For a better understanding of the present invention together with other and further objects, reference is made to the following description taken in conjunction with the accompanying drawings:

BRIEF DESCRIPTION OF THE DRAWINGS

FIG. 13 is a perspective view of a setting and returning device for the original picture film holder;

DESCRIPTION OF THE PREFERRED EMBODIMENTS

Figure 1:
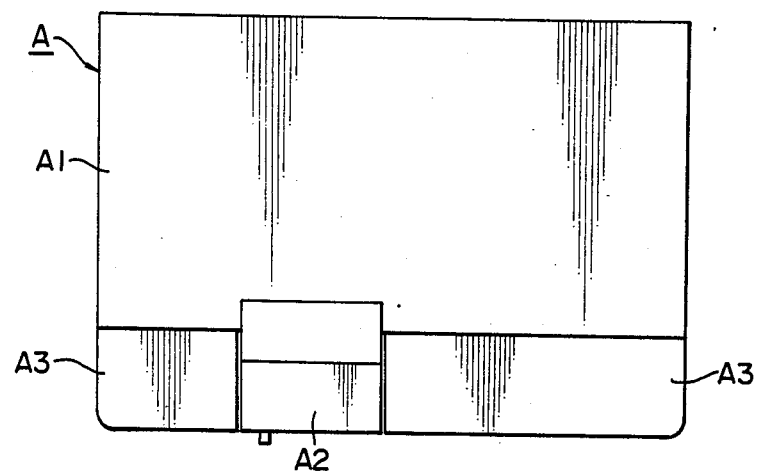
FIG. 1 is a top view of one component of a photographic contact printing apparatus according the the present invention.

A photographic contact printing apparatus shown in the drawings primarily includes the following seven components: (i) a body A, (ii) a light projector B, (iii) a device for loading and unloading original picture film holder C, (iv) a storage tray device for unexposed film D, (v) a storage tray device for exposed film E, (vi) a film transporting device F, and (vii) a controller G.

(i) Body A

Figure 2:
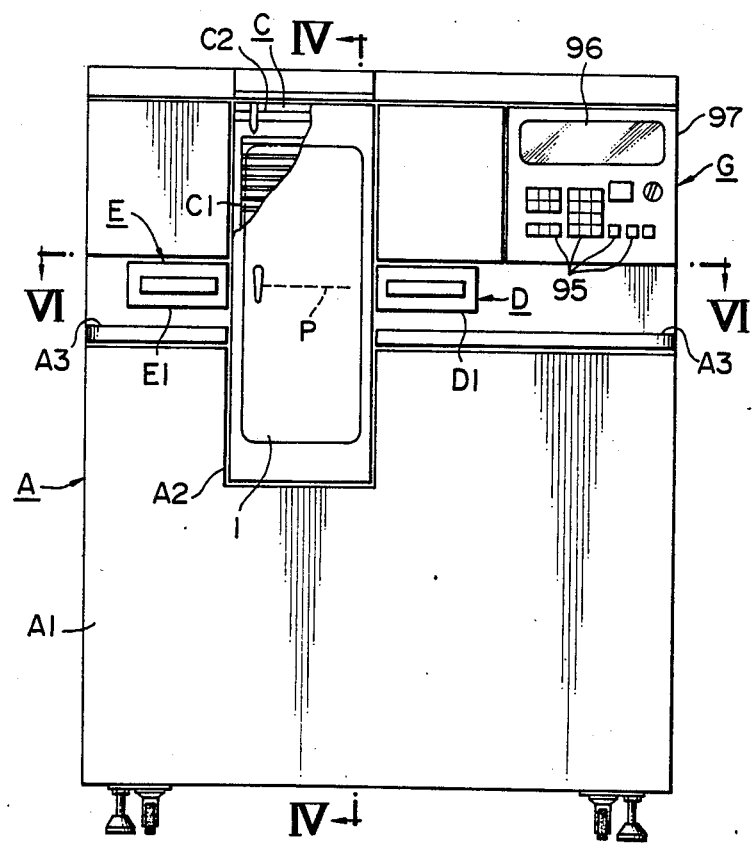
FIG. 2 is a front view of the apparatus shown FIG. 1.
Figure 3:
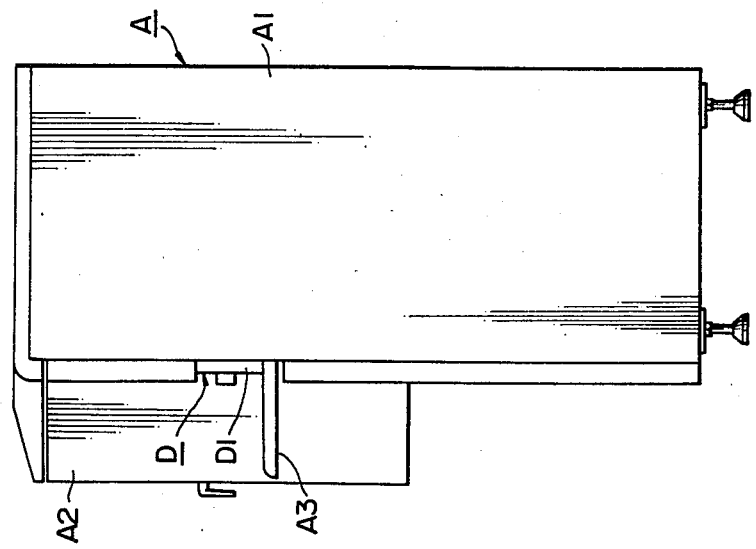
FIG. 3 is a side view of the apparatus shown in FIG. 1.

The body A includes a housing, which is adapted to shield light and inside of which mechanisms and members that will be described hereinafter are supported. As shown in FIGS. 1, 2, and 3, the body A includes a frame A1, a loader housing A2 for accommodating an original film holder, or loader, and which is mounted in front of the frame A1, and horizontal tables A3, which are mounted on both sides of the loader housing A2. On the front surface of the loader housing A2 there is provided a door 1, which shields the inside of the body completely from light when it is closed.

(ii) Light projector B

Figure 4:
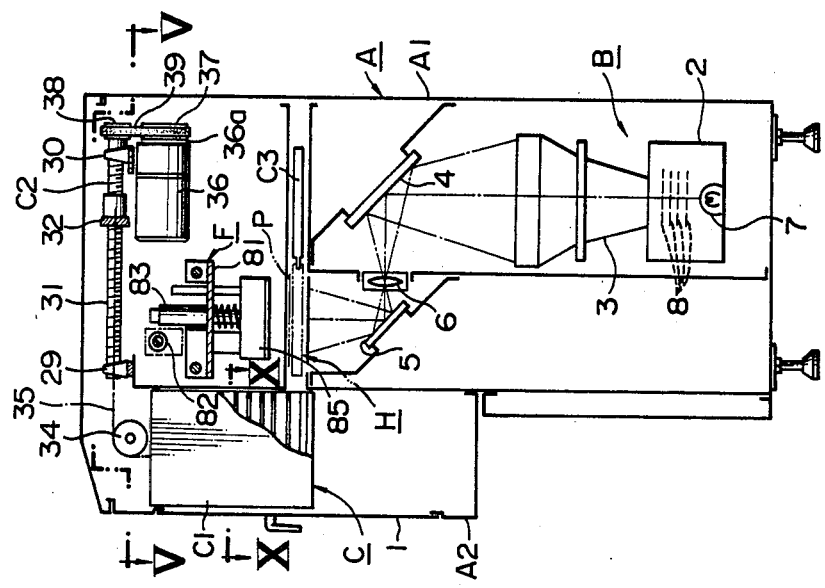
FIG. 4 is a sectional side view taken along line IV—IV in FIG. 2.

A light projector B is mounted inside of the body A, and it projects the light to an exposing aperture P in the body A. The projector compromises, as shown in FIG. 4, a lamp house 2 disposed in the rear of and downward from loader housing A2; a light diffusion box 3 mounted on the upper portion of the lamp house 2; a mirror 4 secured slantingly to the upper part thereof; a second mirror 5 also slantingly secured in the body A1 and which is in front of the first mirror 4; and a lens 6 fixed between the first and the second mirrors 4 and 5. A light beam projected from the lamp house 2 passes through the exposure aperture P, which opens in the rear portion of the loader housing A2 a little higher than the surface of the tables A3, and through a Z-shaped passage via the two mirrors 4 and 5 and the lens 6. The lamp house 2 contains a light source 7 such as a Halogen lamp and a plurality of color filters 8 such as yellow (Y), magenta (M), Cyan (C), and neutral gray (K), which are automatically shifted in the house 2 on an optical axis L by an appropriate amount based on conditions set up by a controller for which a description will be given hereinafter. The automatic controller for the color filters has not direct relation with the present invention, so that a detailed description therefore is not included herein.

(iii) Device for loading and unloading original picture Film loader C

Figure 5:
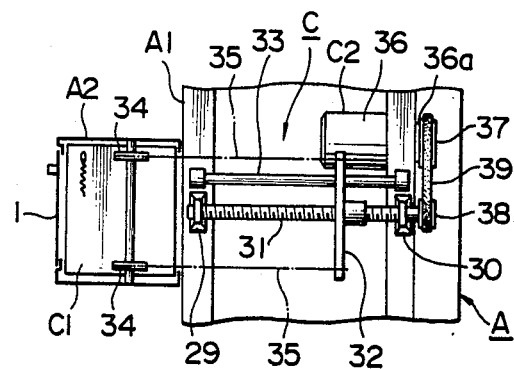
FIG. 5 is a sectional view taken along line V—V in FIG. 2.
Figure 6:
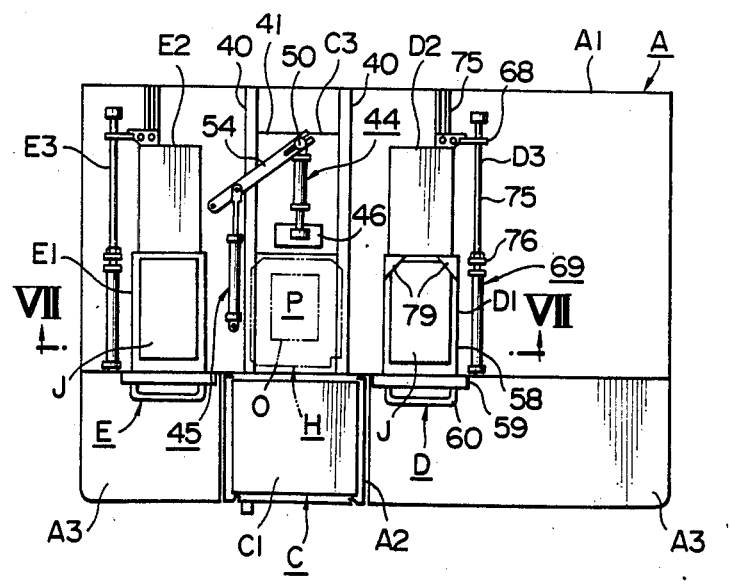
FIG. 6 is a sectional top view taken along line VI—VI in FIG. 2.
Figure 7:
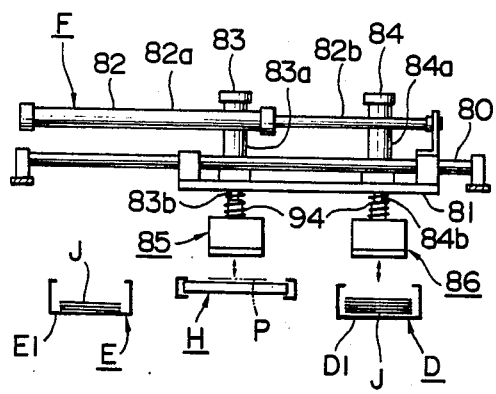
FIGS. 7 and 8 show a film transporting device in different positions.

A device for loading and unloading original picture film holder C is mounted in the body A and loads and/or unloads the original picture film loader at the exposure aperture. In this component, as shown in FIGS. 4, 5, and 6, there is provided an elevating, or lifting, case C1 mounted in the loading housing A to raise or lower each of the plurality of the original film holders H on each of which an original picture film O is mounted. Film holders H are supported in a stacked manner. A driver C2 shifts the lifting case C1 in a vertical direction so that the desired one among the original picture film holders H is placed on the same level as the exposure aperture P and is pushed into the lifting case C1.

Figure 9:
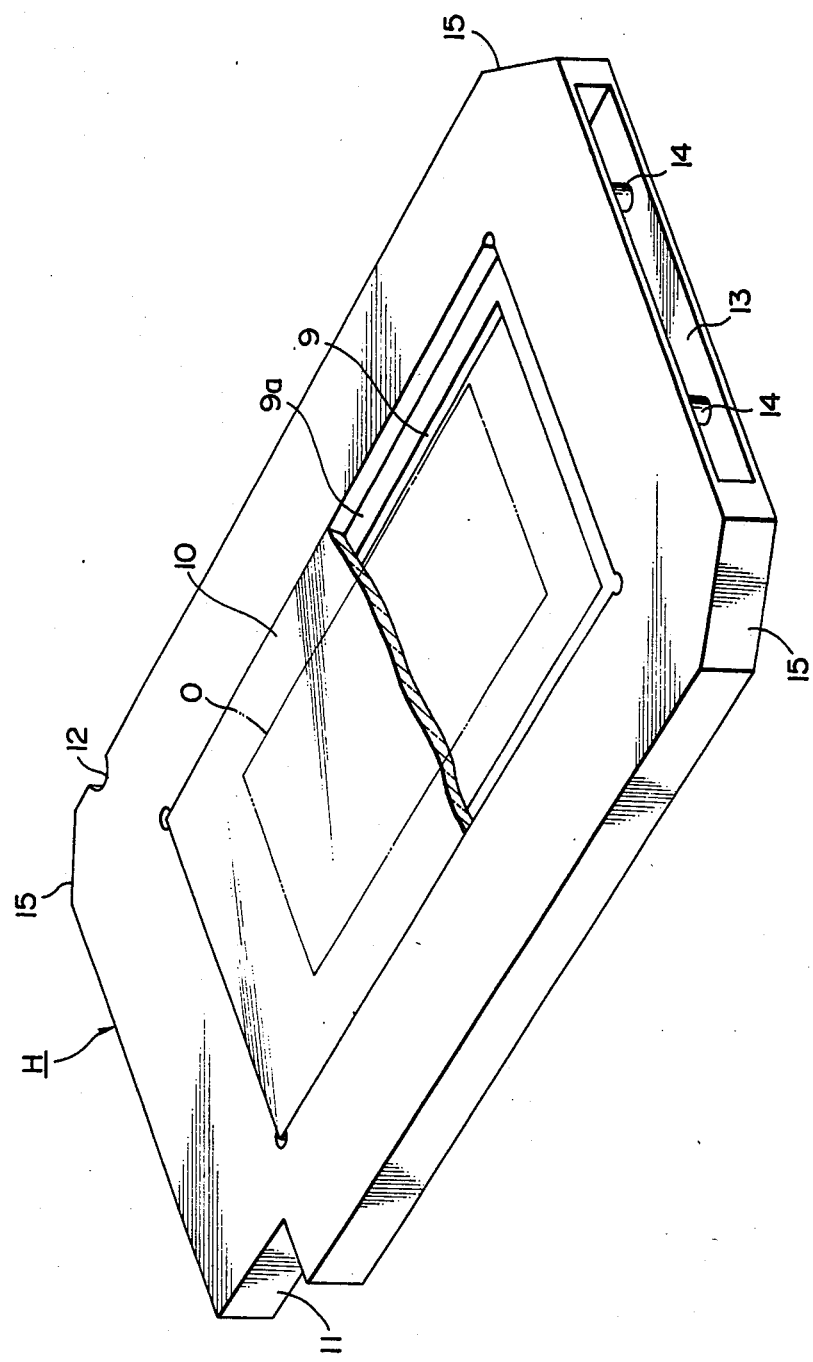
FIG. 9 is a partial and perspective view of an original picture film holder.

In detail each of the original picture film holders H includes, as is shown in FIG. 9, a rectangular frame, which has an aperture 9 on the inside of which a transparent plate 10 made of such material as glass or the like is fitted. On the upper surface of the transparent plate 10, which is shown in figures as glass plate 10, a sheet of the original picture films O is affixed by, for example, adhesive tape.

At one corner of the front edge of the original film holder 10 a stepped cut 11 is formed and at the side edges near the other corner a hemispherical hollow 12 is formed. In the rear edge of the original picture film holder H a horizontal recessed channel 13 is provided. In this channel a pair of vertical pins 14 are mounted.

In addition, except for the corner portion at which stepped cut 11 is located, the remaining three corner portions have fillets 15 for facilitating insertion of the original picture film holder H into the lifting case C1.

Figure 10:
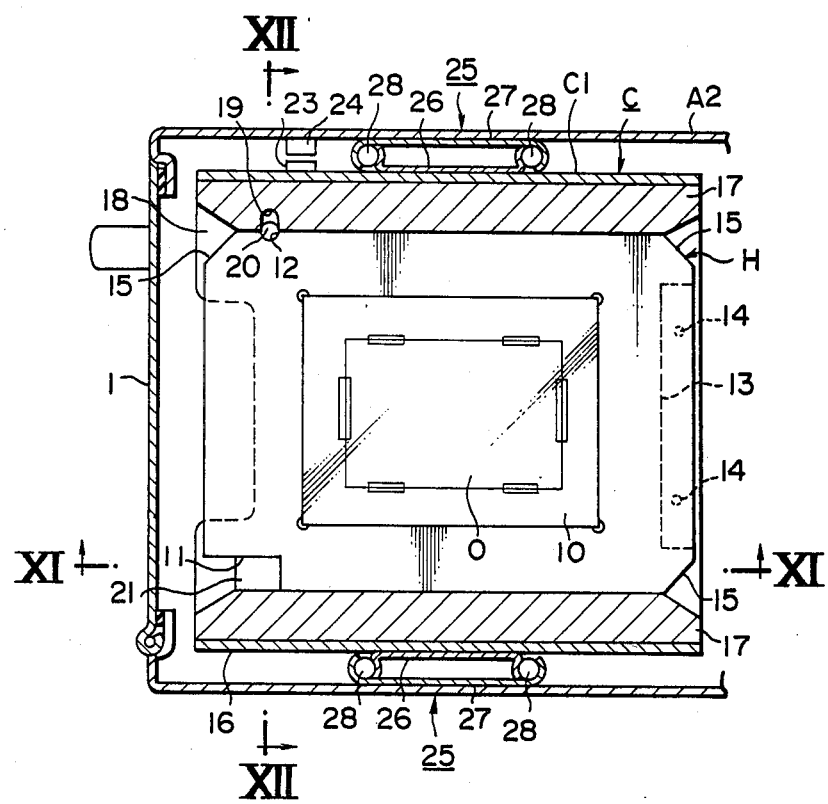
FIG. 10 is an enlarged plane view taken along one X—X shown in FIG. 4.
Figure 11:
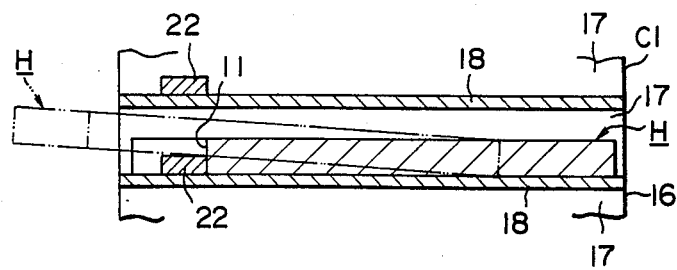
FIG. 11 is a sectional side view taken along line XI—XI shown in FIG. 10.
Figure 12:
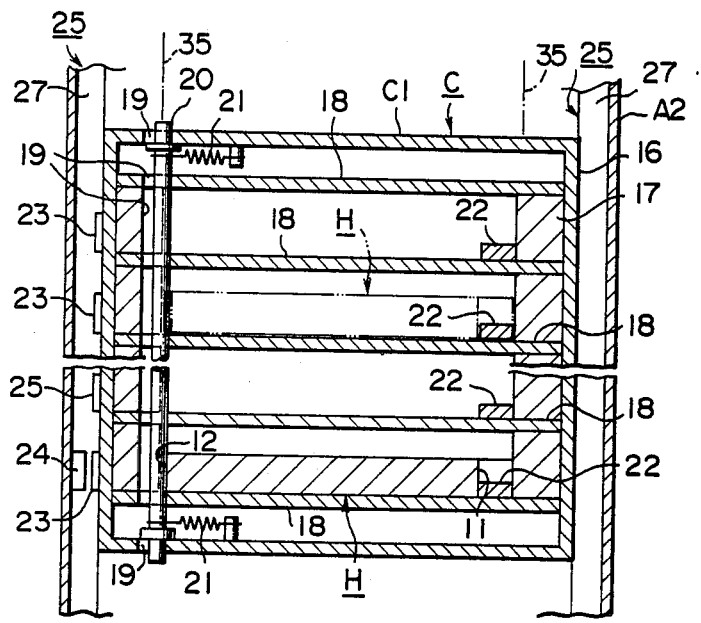
FIG. 12 is a sectional side view taken along line XII—XII shown in FIG. 10.

As shown in FIGS. 10, 11, and 12, the lifting case C1 includes a box 16, the front face and cover of which are supported by overlapping spacers 17 at both sides and a plate, or shelf, 18 disposed horizontally. At the left side in the forward portion of the box 16 an elongated hole 19 vertically penetrates the upper and the lower walls of the box 16 and a part of the left side of the spacer 17. In the elongated hole 19 there is fitted a vertical bar 20.

The vertical bar 20 is always biased toward the inside of the box 16 by a pair of springs 21 mounted between both ends of the upper and the lower parts of the box 16 and the upper and the lower walls thereof. In its normal state a portion of the bar 20 projects from the inside of the left side spacer 10. At the right front part of each of the shelves 18 as seen in FIG. 12, a rectangular stop 22, having a thickness of about half of that of the original picture film holder H, projects. the stop 22 is adapted to fit with the stepped cut 11 in the original picture film holder H. A space between the upper surface of the stop 22 and the shelf 18 over the surface is thicker than that of the original picture film holder H. Thus, by opening the door 1 of the loader housing A2, into each space between each of the stops 22 of the lifting cases C1 and above shelves 18, as shown by two dotted lines in FIG. 11, the original picture film holder H is slantingly inserted so that the hemispherical hollow 12 may engage with the bar 20. Then, the stepped cut 11 of the original picture film holder H engages with the stop 22 and the original picture film holder is horizontally set on the shelf 18. To take out the original picture film holder H from the lifting cases C1, it is merely required to lift the leading edge of the original picture film holder H, remove the stepped cut 11 from the stop 22, and draw out holder H an a forward direction.

At the side surface of the box 16 there are provided a plurality of activating pieces 23, each of which is displaced at positions corresponding to a vertical space corresponding to that of the position of the shelf 18 at each of the levels of each step 18. On the inside of the left side of the loading housing A2 as shown in FIG. 12, sensors 24 for sensing the vertical position of the lifting case C1 are mounted at appropriate positions opposite the activating pieces 23. The activating pieces 23 and the sensors 24 may be well known in the art, for example they may be a sensing switch that includes an iron element and a magnet, or that includes a luminescent element and a light-sensitive element. The sensor 24 senses the activating piece 23 and activates a signal. The driver C2, which is controlled by a controller G (to be described hereinafter), acts to move one predetermined original picture film holder H in the lifting case C1 so that it may match the height of the exposure aperture P in a vertical direction.

At both sides of the lifting case C1, a pair of guide rails 25, which guide the above-mentioned movement, are provided. The guide rails 25 comprise a pair of inner rails mounted on both side surfaces of the lifting case C1; a pair of vertical outer rails 27 mounted on the inside surfaces of both sides of the loader housing A2 and being adapted to cover the inside rails 26; and a plurality of ball bearings 28, which are interposed between the inner rails and the outside rails for moving the lifting case C1 smoothly.

As shown in FIGS. 4 and 5, the driver C2 comprises a screw threaded axis 31 rotatably supported by a pair of bearings 29 and 30; a guide bar 33 horizontal to the screw threaded axis 31; a shifting plate 32 through which extends the screw threaded axis 31 and the guide bar 32; an engaging portion at which driver C2 engages with the screw threaded axis 31 for shifting between front and rear directions according to the rotation of the screw threaded axis 31; a pair of chains 35 each end of which is connected to the opposite ends of the guide bar 32 and which are coupled with the upper surface of the lifting case C1 through a pair of sprockets 34 mounted at the upper part of the loader housing A2; a reversible motor 36 mounted on the upper portion of the body A; a plurality 37 secured to a shaft 36a of the reversible motor 36; a pulley 38 secured to the rear end of the screw threaded axis 31; and a belt 39 which is operatively positioned between the two pulleys 37 and 38.

Figure 14:
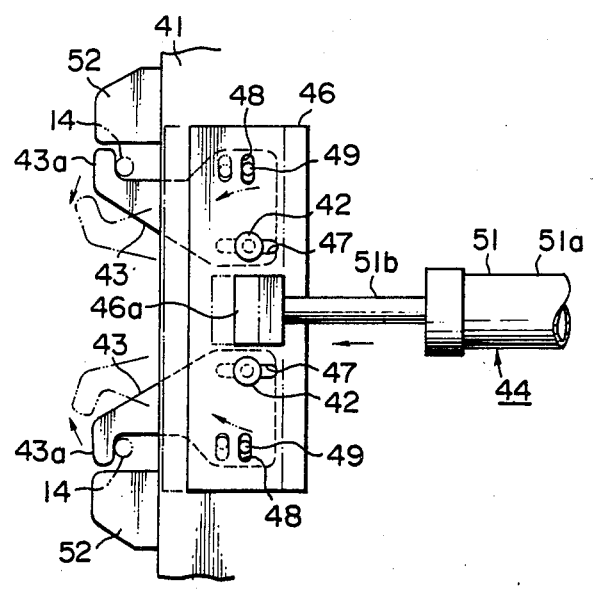
FIG. 14 is an enlarged top view of an important part of the setting and returning device.

As described above, when the motor 36 is driven, the screw threaded axis 31 is rotated to move the guide plate 32 in forward and rearward directions so that the lifting case C1, which is suspended by the chains 35, may move in a vertical direction. As shown in FIGS. 13 and 14, the push and pull device C3 of the original picture film holder H includes the members listed below.

A pair of guide rails 40 are mounted at the same height as that of the exposure aperture P in the body A so that a selected original picture film holder H in the lifting case C1 may be shifted between the lifting case C1 and the exposure aperture P. A sliding box 41 slides in forward and rearward directions along the gudie rails 40. A pair of connecting levers 43 are pivotably mounted on each of axes 42 in the sliding box 41. A hook 43a projects from the leading edge of the box 41 at each of the connecting levers 43. Hooks 43a are capable of moving between a connecting position shown by a solid line in FIG. 14 and a release position shown by a phantom line in the same FIG. 14. A driver 44 is mounted on the sliding box 41 for appropriately shifting the pair of the connecting levers 43 to the above-described two positions. A driver 45 is mounted in the body A for reciprocally moving the sliding box 41 along the guide rails 40 so that the connecting levers 43 may move the selected original picture film holder H to an engaged position therewith.

In the embodiment shown in the figures, the driver 44 of the connecting levers 43 is constructed as follows. A sliding plate 46 mounted on the upper surface of the sliding box 41 is adapted to shift in both forward and rearward directions at a predetermined distance by fitting two pairs of slots 47 oriented in the forward and rearward directions and formed on the sliding plate 46 in the axes 42. A pair of slots 28 oriented transversely in the right and left directions (at right angles with respect to the front and rear directions) formed in the sliding plate 46 are engaged with pins 49 provided on the connecting livers 43. In addition, a tip end of a rod 51a of an air cylinder 41 pivotally mounted on an axis 50 vertically mounted on the rear part of the sliding box 41 is connected with the projecting part 46a of the shifting plate 46. That is, with the air cylinder 51 the sliding plate 46 is moved in forward and rearward directions in the range of the slot 47, so that the pair of the connecting levers 43 can be shifted to a releasing position and an engaging position simultaneously.

Further, at both ends of the leading edge of the sliding box 41 a pair of guide blocks 42 are positioned in slots 47 for precisely regulating the positions of the sliding box 41 and the original picture film holder H. On the other hand the driver 45 of the sliding box 41 includes a link lever 54 the base of which is pivotally mounted to an appropriate position of the body A and at the top end of which is a form K member 54a which puts the axis 50 of the sliding box 41 between two fingers thereof. A cylinder 55a has a base which is pivotally mounted to an axis 56 vertically mounted at an appropriate place in the body A. An air cylinder 55 including a rod 55b is pivotally mounted at one end thereof on an intermediate portion of the link lever 54 by an axis 57. That is, by inserting and/or drawing the rod 55b of the air cylinder means 55 in and/or out the cylinder 55a, the link lever 54 rotates and the sliding box 41 is shifted along the guide rails 40. Operation of an original picture film holder setting a returning device C3 will be described hereinafter. By operation of the air cylinder 51, the sliding plate 46 is shifted in a forward direction. By rotating the link lever 54 in a forward direction with the air cylinder 55, the pair of connection levers 43 are placed in their releasing positions. The sliding box 41 is advanced and the hook 43a of the connecting levers 43 is inserted into the recessed channel 13 of the original picture film holder H and then by means of the air cylinder 51 the sliding plate 46 is returned by the air cylinder 51, whereby the connecting levers 43 are moved to engage these hooks 43a with the pins 14 of the original picture film holders H. Then by means of the air cylinder 55, the link lever 54 is rotated in a rearward direction and the sliding box 41 and the original picture film holder H connected with the sliding box 41 by means of the pins 14 and the connecting levers 43 can be pulled out over the exposing aperture P.

If the air cylinder means 55 is actuated in a reverse direction to rotate the link lever 54 in a reverse direction to that of the above mentioned direction, the original picture holder H can return to the original position in the lifting case C1. After returning the original picture film holder H to the predetermined position, the sliding plate 46 is advanced by the air cylinder 51 to bring the connecting lever 43 to a releasing position. Thus, the air cylinder 55 returns the sliding box 41 to a position at which the exposure aperture is covered.

(iv) Storage tray device for unexposed films (D)

Figure 15:
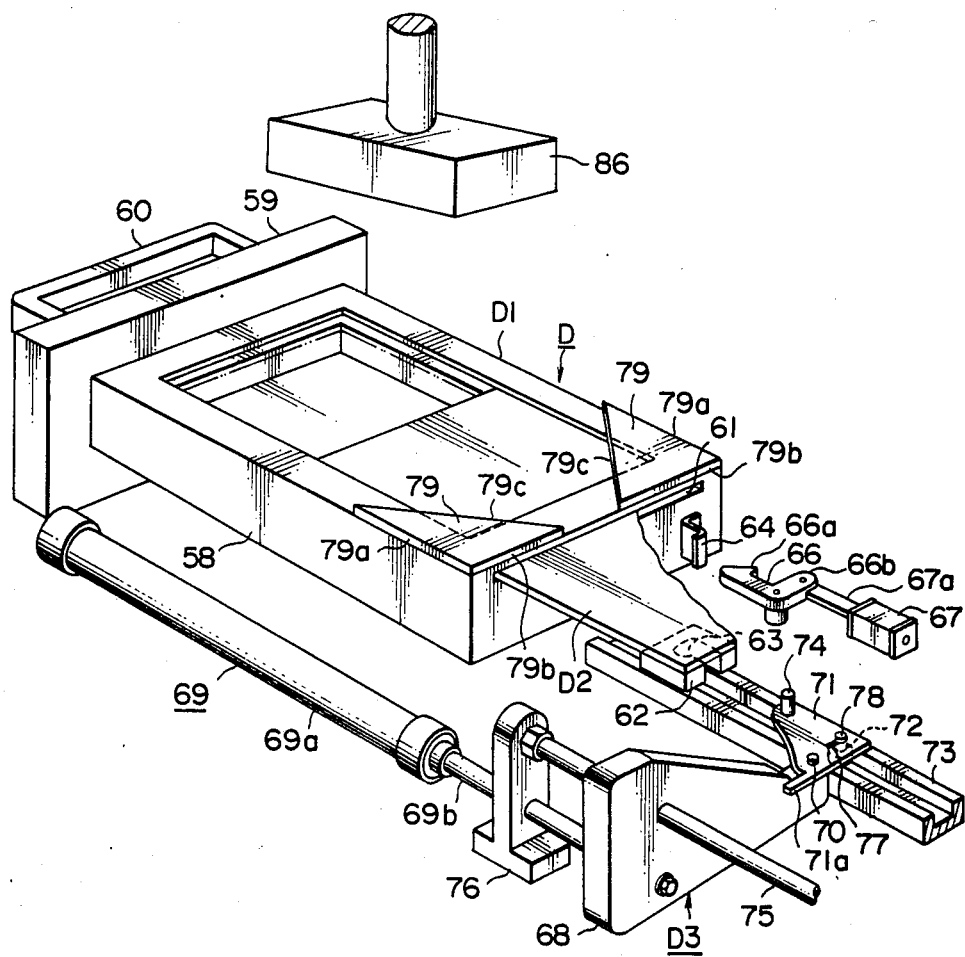
FIG. 15 is a perspective view of a tray for storing unexposed films with a shutter means.
Figure 16:
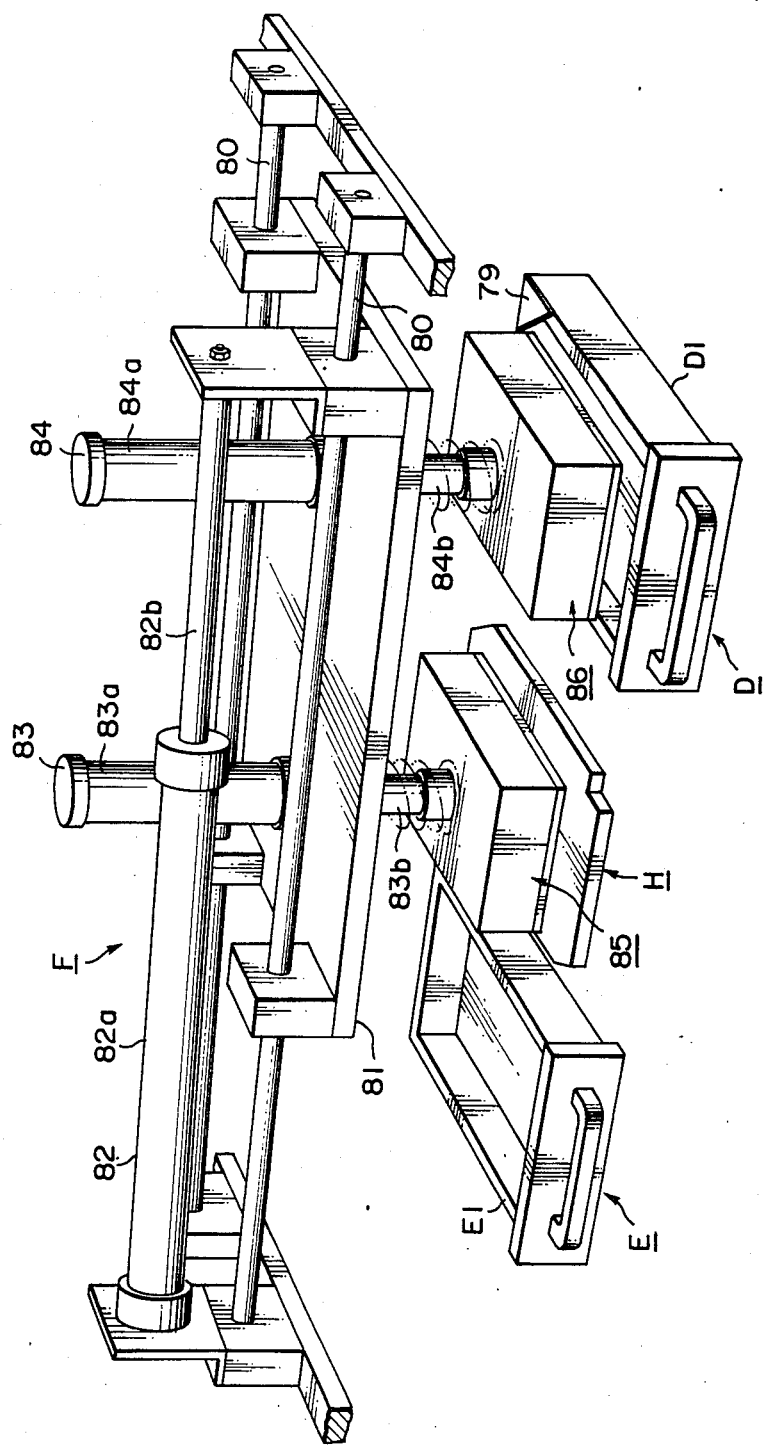
FIG. 16 is a perspective view of a film transporting device.

As shown in FIGS. 2, 6, 7, 8 and 15, a storage tray device for unexposed films D is mounted in the body A situated at the right side of the loader housing A2 for original picture film holders with nearly the same height as that of the exposing aperture P. The storage tray device D comprises, as is shown in FIG. 15, a storage tray D1 for unexposed films of a drawer-shape which can be inserted and drawn from the top surface thereof; a light-shielding lid D2 for shielding sensitive films stored in the tray device from the light, when the tray D1 is drawn out of the body A1; and a closure means D3 which automatically closes the light-shielding lid D2. The tray D1 includes a box 58 the upper surface of which is open and a flange 59 with a handle 60, both of which are mounted at the front surface of the box 58. The flat plate-shaped light-shield lid D2 is inserted into a parallel groove 61 formed in the vicinity of the upper edge of the box 58 and is opened to the rear area of the box 58 by a rearward movement. When the light-shield lid D2 is fully inserted into the groove 61 and the upper opening of the groove is closed, the inside of the box 58 becomes a light-shield chamber which can protect accommodated films from any accidental exposure. Even when the light-shield lid D2 is fully closed, the rear edge of the light-shield lid D2 is elongated so as to project from the rear surface of the tray D1. At the lower surface of the projected portion of connecting block 62 for engaging with the opening and closing mechanism D3 is secured. An L-shaped groove 63 is formed in the connecting block 62 one end of which opens rearwardly.

At the rear surface of the tray D1 a lock 64 is mounted. The reason for this is that when the tray D1 is set in the body A1, it engages with a hook 66a of a hook lever 66 mounted in the body A to lock tray D1 so that the tray D1 cannot be drawn out. The hook lever 66 is an L-shaped crank and is pivotally mounted on an axis 65 secured within the body A. A plunger 67a of a solenoid 67 is coupled with an arm 66b of the hook lever 66. Accordingly, when the solenoid 67 is actuated, the plunger 67a pushes the arm 66b to rotate the hook lever 66 and release engagement with the hook 66a and the lock 64 so as to be able to take out the tray D1 from the body A.

The solenoid 67 is controlled not to operate by the controller G while the light-shield lid D2 is opened by the opening and closing mechanism D3. Therefore, while the light shield D3 is being opened, the tray D1 cannot be taken out.

The opening and closing mechanism D3 comprises a transporting member 68 movably mounted in the body A in the same direction as the direction of the opening and closing slide operation, i.e., in forward and rearward directions of the light-shield lid D2; an air cylinder 69 which drives in the same direction as that of the transporting member 68; a nearly right-angled triangle-shaped swing lever 71 pivotally mounted to an appropriate place on the transporting member 68 at an axis 70; a friction piece 72 projectingly mounted to the under surface of the swing lever 71; a guide rail 73 on which the friction place 72, rides with an appropriate friction force when the swing lever 71 moves in forward and rearward directions toward with the transporting member 68; a connecting pin 74 erected on the upper surface of the swing lever 71 and adapted to engage with the groove 63 of the connecting block 62 of the light-shield lid D2; a guide bar 75, which is supported by a pair of brackets 76 (one of the pair is shown in FIG. 15) in the body A and which guides the movement of the transporting member 68 in forward or rearward directions; and an air cylinder 69 including a piston rod 69b which penetrates a cylinder 69a fixed at opposite ends by the body A, and is mounted to a bracket 76. Air cylinder 69 operates in conjunction with a suction head member 86 at the top end thereof, which will be discussed in detail below.

As seen in FIG. 15, the friction piece 72 can move a little distance in the right and left directions and rotate centered on an axis 78 of the friction piece. In addition, it is adapted to compensate for variation in contacting pressure generated between the friction piece 72 and the guide rail 73 because of the displacement of the swing lever 71. But the movement and rotation required for the friction piece 72 are quite small so that the friction piece 72 may be secured to the swing lever 71, or there may be provided some clearance between the guide rail 73 and the friction piece 72 or between the swing lever 71 and the transporting member 68. In addition, a projection 71a extending from the sides of the swing lever 71 along the rear surface of the transporting member 68 limits the movable range of the swing lever 71.

When the transporting member 68 moves in a forward direction, that is, the same direction as the closing direction of the light-shield lid D2, along with friction piece 72 and the guide rail 73, the swing lever 71 is swung out to a position such that the projection 71a will contact the transporting member 68. The position is such that the connecting pin 74 does not align with an opening of the groove 63 of the light-shield lid D2, that is, this position is a non-connecting position. On the other hand, when the transporting member 68 moves in the direction of the opening of the light-shield lid D2, then by means of friction generated between the friction piece 72 and the guide rail 73, the swing lever 71 rotates a little in a counter-clockwise direction centered at the axis 70, and the connecting pin 74 occupies the connecting position at which it engages with a stepped part 63b formed at the innermost portion of the groove 73.

Accordingly, air cylinder 69 moves the transporting member 68 in a forward direction and after the connecting pin 74 contacts the innermost portion of the groove 73, the air cylinder 69 is actuated in the reverse direction so as to move the transporting member 68 rearwardly. Then the swing lever 71 is pivoted to the connecting position and the connecting pin 74 engages with the stepped part 63b to open the light-shield lid D2 rearwardly. From the light-shield lid D2 being in an open state, the air cylinder 69 moves the transporting member 68 in a forward direction so as to pivot the swing lever 71 to the non-connecting position, and the connecting pin 74 contacts the innermost portion of the groove 63 so as to push the connecting block 62 and close the light-shield lid D2. After the light-shield lid D2 is closed, the connecting pin 64 is maintained at a non-connecting position, so that when the tray D1 is drawn out in a forward direction of the body A, the light-shield lid D2 is not opened. In addition, even in the case of the light-shield lid D2 being completely closed, the solenoid 67 actuates to release the locked state of the hook device 66 of the tray D1. Further, at both corners of the rear part of the upper surface of tray D1, a separator which takes out films having been stored one by one is mounted. Regarding them, descriptions will be given hereinafter with reference to FIGS. 24a and 24b.

(v) Storage Tray device for exposed films (E)

Figure 8:
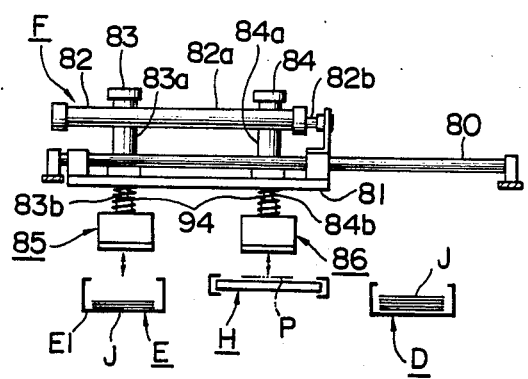

As shown in FIGS. 2, 6 and 8, the storage tray device for exposed films E is disposed symmetrically with the storage tray device for unexposed films D so as to put the loader housing part A2 for original picture film holders between the storage tray device for exposed films E, Tray device E, a tray E1, a light-shield lid E2, and an opening and closing device E3 for the light-shield lid. These components are symmetrical with those components of the storaging tray device for unexposed films D above mentioned, and except for the separator 79 in the tray D1, all the components are identical with each other, so that further detailed explanations are not necessary herein.

(vi) Film transporting device (F)

A film transporting device F performs the task of transporting unexposed films J1 stored in the tray D1 to the original picture films O, which have been set over the exposure aperture P, pressing the unexposed films J1 for contact printing and transporting the exposed films J2 from the original picture films O to the tray E1. As shown in FIGS. 4, 7, 8 and 16, the device F includes a pair of a front and a rear guide rods 80 mounted to appropriate places at the upper portions of the exposure aperture P in the body A. A transporting or sliding die 81 is slidably mounted on guide rods 82. An air cylinder including a cylinder 82a and a piston rod 82b is mounted parallel to the guide rods 80. The base end of the cylinder 82a is connected with the body A. The end of the piston rod 82b is connected with the sliding die 81. By actuating the air cylinder 82, the sliding die 81 is moved along the guide rods 80.

On the slidable die 81 a pair of air cylinders 83 and 84 having cylinders 83a and 84a and piston rods 83b and 84b are vertically mounted. The piston rods 83b and 84b penetrate the slidable die 81 and extend downward, and at each of the lower ends thereof suction heads 85 and 86 respectively are mounted. Between the underside of the slidable die 81 and each of the suction heads 85 and 86 there is provided a spring 94. Each of the springs 94 energizes the corresponding suction heads. When the air cylinder means 83 or 84 operates, the suction heads 85 or 86 are elevated.

Figure 17:
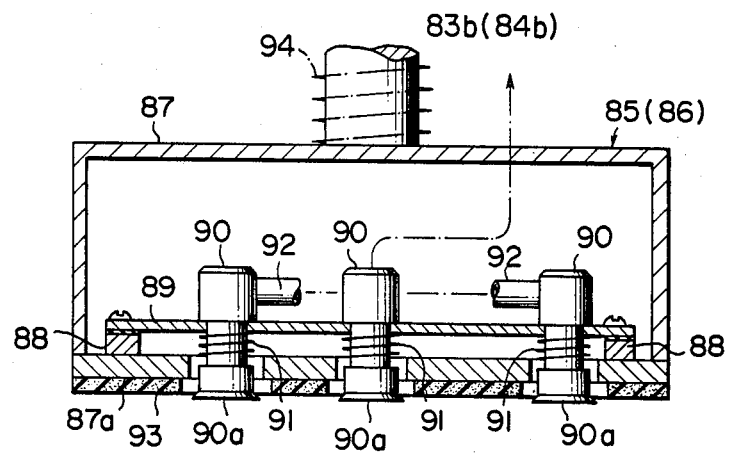
FIG. 17 is an enlarged sectional view of a suction head in the film transporting device.
Figure 18:
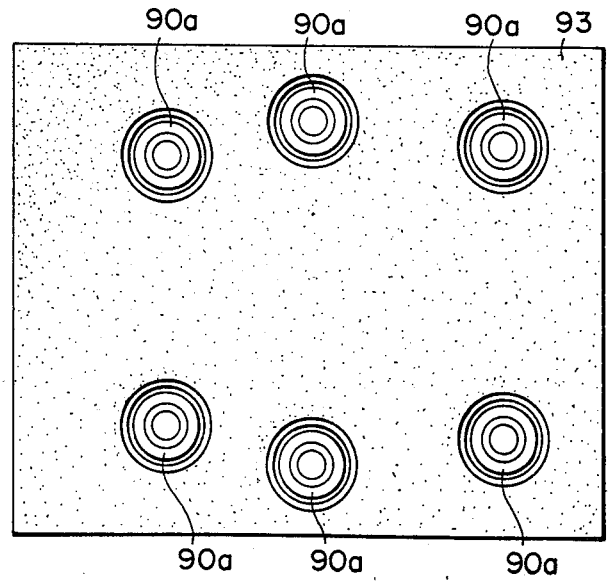
FIG. 18 is a bottom view of the suction head.

The distance between the pair of the suction heads 85 and 86 is equal to the distance between the center of the exposure aperture P and the centers of trays D1 and E1, and a traveling stroke of the slidable die 81 is also equal to that distance. That is, when the slidable die 81 reaches to either of the terminal ends of the traveling stroke, one of the suction heads aligns to the exposing aperture P and the other suction head is positioned over the tray D1 or E1. Each of the suction heads 85 and 86 has an identical construction one of which is shown in FIGS. 17 and 18. A suction head 85 or 86 mounted at the lower end of either of the piston rod 83b or 84b, respectively, is constructed as follows: On the upper surface of a bottom plate 87a, a supporting plate 89 is mounted by interposing spacers 88 in parallel to the bottom plate 87a, and to this supporting plate 89 a plurality of suction pipes 90 each of which has a rubber nozzle 90 at the lower end thereof, are fitted by penetration of the supporting plate 89. the suction pipes 90 are connected to a vacuum source (not shown) with flexible tubes. On the surface of the underside of the bottom plate 87a there is attached a cushion 93 made of sponge or rubber plate etc. covering the entire surface of plate 87 except for those parts on which rubber nozzles 90a are mounted. Between each of the rubber nozzles 90a and the supporting plate 89 a spring 91 having relatively weak elasticity is interposed which energizes each of the rubber nozzles 90a downwardly. With this energization by springs 91, each of the lower ends of the rubber nozzles 90a projects slightly from the undersurface of the cushion 93 in the normal state. But when either the suction head 85 or 86 is lowered to contact with the surface of a film to be transported, the rubber nozzles 90a are pushed easily to the same plane of that of the cushion 93. The suction head 86 at the right side transports unexposed films J1 stored in the tray D1 to the exposure aperture P and the remaining suction head 85 at the left side transports the exposed films J2 to the tray E2.

Next, the operation and function of the film transporting device F are explained hereinafter.

The two trays D1 and E1 are fitted up to the body A, the light-shield lids D2 and E2 thereof are opened and the original picture film holder H to which desired original picture films O are mounted are set at the exposure aperture P. The suction heads 85 and 86 are raised to their topmost ends by means of the air cylinders 83 and 84. The air cylinder 82 moves the slidable die 81 to a position shown in FIG. 7 or FIG. 16, that is, to a position at which the suction head 86 at the right side is aligned to the tray D1 and the suction head 85 at the left side is aligned to the exposure aperture P.

When a cylinder 84a of the air cylinder 84 is released to the air, the weight of the piston rod 84a and the suction head 86 and the force of the spring 94 lowers the suction head 86 so that the undersurface thereof may contact with a sheet of the unexposed film J1 placed on the topmost position of the unexposed films J1 accomodated in the tray J1. Then the vacuum source connected with the suction pipes 90 of the suction head 86 operates to hold the film by suction force at the rubber nozzles 90a. In this case it is desirable to start the vacuum source prior to this time, for example, simultaneously with the lower of the suction head 86. After then by means of the air cylinder 84, the suction head 86 is raised together with the film J1 suctioned thereby. In this case, the separators 79 disposed at the both corners of the tray D1 serve to prevent the sequentially overlapped films under the suctioned film from being suctioned and transported together it.

Figure 24A:
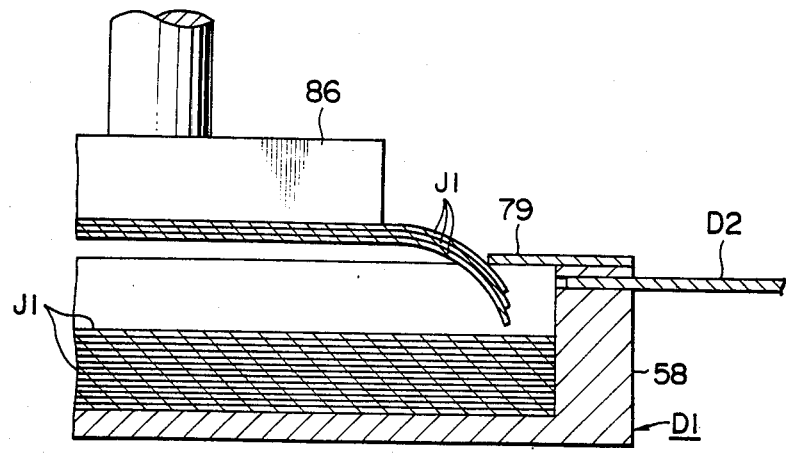
FIGS. 24a and 24b show a stored film take-off mechanism.
Figure 24B:
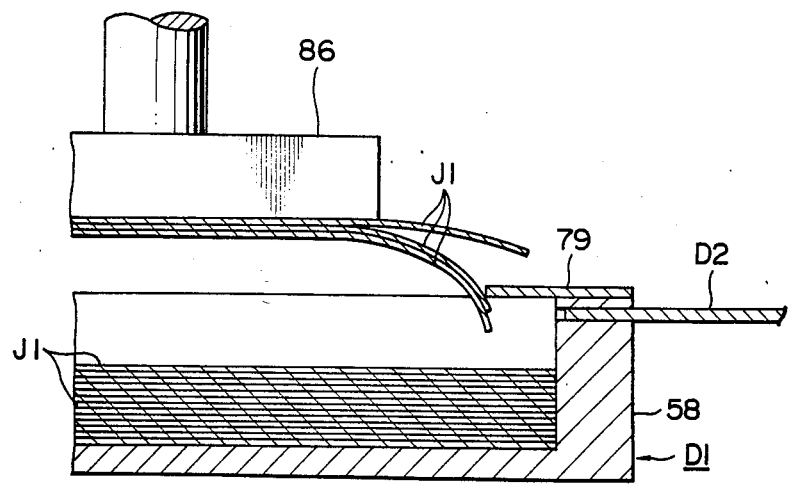

As shown in FIGS. 24a and 24b, two corners of the suctioned film J1 are held by each of the separators 79 and the film J1 are held by each of the separators 79, and the film J1 is bent downwardly to separate other films under the suctioned film J1. In order to prevent the film being transported from being damaged, the separators 79 are preferably made of soft material such as rubber, etc. One separator may well do, of course. When the film suctioned and held by the suction head 86 is raised to a position at which the end of the film passes the separator 79, it returns to its normal flat state by its own elasticity.

As above described, after the suction head 86 holding one suctioned unexposed film J1 is raised to the desired position, the transporting die 81 is moved to the position shown in FIG. 8 by the air cylinder 82 in the same manner as that mentioned above. The suction head 86 is then lowered and the suctioned unexposed film J1 is contacted with the original picture film O mounted to the original picture film holder H set on the exposure aperture P. After an appropriate time lag, the suction pipes 90 stop their suctioning operation. At this time the film J1 is contactedly pressed to the original picture film O uniformly by the spring 94 and the cushion 93. The suction head 86 is of a size which can cover the whole glass surface of the original picture film holder H, so that during the exposure operation by the light projector B, the photosensitive materials accommodated in the tray D1 or the tray E1 are protected from undesired exposure. In addition, in the case of exposure it also is possible to make sure of contact of the unexposed film J1 with the original picture film O by applying air pressure onto the upper surface of the film J1 by feeding compressed air into the suction head 86 through the circumferences of the rubber nozzles 90a. Further, around the lower end of the suction head 86 a skirt or curtain touches with the upper surface around the exposure aperture P for assuring a total shielding against the passage of light. Under the above-described conditions the lamp 7 of the light projector B is turned on to expose an image of the original picture film O on the unexposed film J1. After exposure is finished, only the suction head 86 is raised at this time since the vacuum source connected with the suction pipes 90 is not being operated, and the film (exposed film hereinafter referred to as "J2") remains on-the original picture film O. Next, the transporting die 81 is moved to a position shown in FIG. 7. Then by releasing the two air cylinders 83 and 84 to the atmosphere, the two suction heads 85 and 86 are lowered, and to the first suction head 86, the same as the aforementioned suction head 85, an unexposed film J1 in the tray D1 is suctioned and maintained. Simultaneously, the second suction head 85 suctions and maintains the exposed film J2 from the original picture film O.

The transporting die 81 is raised to a position shown in FIG. 8 so as to lift the two suction heads 85 and 86 after stopping the suctioning operation if the two suction heads. With this action the exposed film J2 is separated from the suction head 85 and stored in the tray E1.

At the same time the second unexposed film J1 is set on the original picture film O and then the second exposure is performed. Further, with regard to replacing a sheet of the original picture, after the exposed film J2 is removed from the exposure position by the suction head 85 and while the next unexposed film J1 is transported to the film holder H position, the push and pull device (FIG. 13) positions the original picture film holder H for the next one. When it is required to reproduce a plurality of duplications from one original picture film O, this change may be carried out after the desired number of film transporting and exposure operations has finished. With respect to all the preset original picture films, when the necessary duplicating operations are finished, the raising and suctioning operations of suction head 86 are not carried out, but only the transportation and storage operations into the tray E1 of the exposed film J2 by the second suction head 85 are performed. The above-described operations of the film transporting device F are performed in accordance with the commands of a controller G which is explained below.

(vii) Control means G

The controller G automatically controls each of the components explained heretofore as (i) to (vi) to operate in desired sequence according to pre-set information. The controller G comprises, as shown in FIG. 2, various kinds of operating switches 95 which set exposure conditions of the original picture film O and the desired number of duplications; an indication panel 97 having an indicator 96 indicating the operational of the state of the system and electric circuit networks (not shown). The electric circuit network may be any kind of network which can operate the whole system according to what is described below. Because the circuit network has no uniqueness relating to the present invention, a detailed explanation therefor is abbreviated.

The entire operation and function of the system according to the present invention are described hereinafter. A detailed explanation for each of the components has been already described from (i) to (vi), so that hereinafter a general description of mutual functions among each of the components, particularly an operational sequential explanation will be given. At first door 1 is opened and each of the desired original picture films O which is mounted onto the original picture film holder H is inserted into the lifting case C1 and the door is closed. The tray D1 for accommodating unexposed films J1 is then taken out of the body. The necessary number, or more, of unexposed films J1 are loaded to the tray D1 in a darkroom directing the emulsion side downward. After closing the light-shield lid D2, the unexposed films J1 are taken out of the darkroom and loaded to the loader housing A2. The tray E1 (empty at this time) for holding exposed films is set up with the loader housing A2 by closing the light-shield lid E2.

A power source is turned on and preliminary data and operational conditions are set up, such as exposure conditions for each of the original picture films O and the necessary number of duplications to be prepared, etc. by a group of switches 95 of an operation panel 97, starting switches being included in the switches 95. The lifting case C1 is moved to the desired height by the driver C2, and thereby the first original picture film holder H is aligned to the height of the exposure aperture P. The push and pull device C3 then draws out the holder A to the exposure aperture P. The starting switch turns on opening and closing mechanisms D3 and E3 relating to the two trays which are operated to open the light-shield lids D2 and E2 of the trays D1 and E1, respectively. After the first original picture film holder H is set up at the exposure aperture P and the two light-shield lids D2 and E2 of the trays, the film transporting device F is actuated to take out the unexposed film J1 of the uppermost among the unexposed films in the tray D1. Film J1 then is tansported to the original picture film O of the original picture film holder H and closely contacted with the original picture film. At this time the light projector B is activated in accordance with the set-up exposure conditions, and the unexposed film J1 is exposed.

When a plurality of duplicated films are made by using an original picture film O, and after exposure is finished, the original picture film holder H set up at the exposure aperture P remains at that position. On the other hand the film transporting device F transport the exposed film J2 on the original picture film holder H to the tray E1, and simultaneously the next unexposed film J1 is transported from the tray D1 onto the original picture film holder H.

When the present number of films J2 are finished regarding one original film O, the push and pull device C3 operates during the next film transporting process. The first original picture film holder H is returned to the lifting case C1 from the exposure aperture P. The driver C2 is then actuated to transport the lifting case C1 to align the next original picture film holder H to the height of the exposure aperture, and the push and pull device C3 draws out the original picture holder H to the exposure aperture P. The same operation as the case of the first original picture film O is then repeated Thus, desired duplicated films are manufactured sequentially.

When the final duplicating exposure regarding the final original picture film O is finished, and after the final exposed film J2 has been accommodated, the opening and closing mechanisms D3 and E3 are actuated and the light-shield lids D2 and E2 of the two trays D1 and E1 are closed. On the other hand the push and pull device C3 returns the final original picture film holder H to the lifting case C1 and the driver C2 returns the lifting case C1 to its initial position. Thus, all operations are completed. A buzzer or a warning lamp may act as a signal of completion of the operation.

OTHER EMBODIMENTS

To understand the present invention with respect to the most fundamental and preferred embodiment detailed descriptions have been given heretofore. Of course, the present invention can be practiced by other embodiments. One important modification is provided regarding construction of the original picture film holder. In an original picture film holder of the above described embodiment an original film is fixed to a glass plate mounted to the original picture film holder by an adhesive tape or the like. Accordingly, the original picture film and the photosensitive material are put between the glass plate and the suction holder and are pressed into contact. It is necessary to closely contact the original picture film with the photosensitive material to obtain sharpness in reproduced picture images. However, if contacting pressure is too great, a Newton ring is apt occur between the film and the glass plate, which occurrence results in impaired quality of the reproduced picture images. To prevent occurrence of a Newton ring a method is known in which a small amount of minute powders are scattered. This method, however, sometimes causes images of the minute powders to appear in the reproduced picture as pin holes, so that the amount of minute powders to be scattered must be as small as possible and uniformly scattered, which action rquires extremely scrupulous attention, so that working efficiency is very low. In addition, in the case of photosensitive materials being rool-films, there is a method for pressing only the edges of an overlapped original film and the roll-film by utilizing its curling characteristics. The strength of curling is not uniform, however, and it causes partial noncontact between the original picture film and the photosensitive film so that sharpness in detail in the resultant picture image is lost and the quality of the reproduced picture is degenerated.

Figure 19:
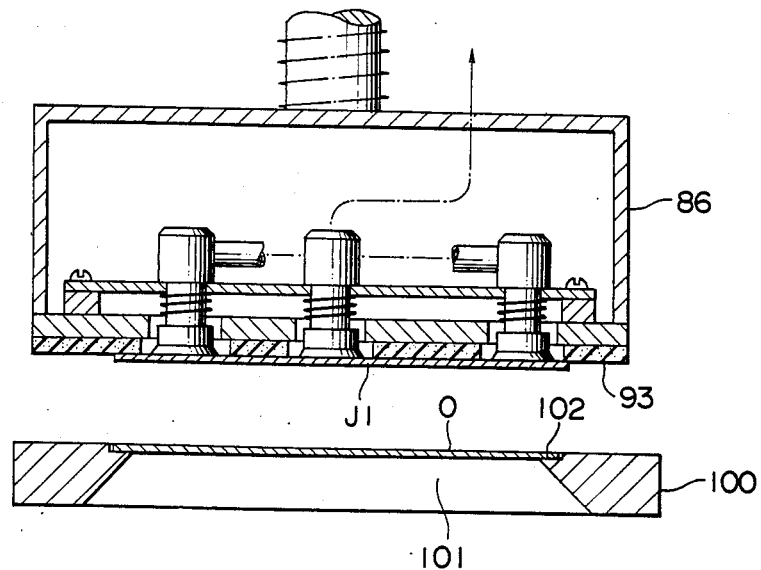
FIG. 19 is a sectional front view of the suction head and the original picture film holder on an exposure aperture formed in a second component of the present invention.

In view of the foregoing disadvantages of the conventional method, in the present invention troublesome methods such as scattering minute powders, etc. are not required in contact printing. The present invention can provide an original picture film holder which can easily realize close contact printing free from an occurrence of a Newton ring. An outline of the present invention is explained by reference to FIGS. 19 and 20. In the upper half of FIG. 19, there is shown the suction head 86 which suctions and thus maintains a sheet of unexposed films J1. This explanation applies as well to the above-described accompanying FIGS. 17 and 18. And in the latter half of FIG. 19 an original picture film holder 100 according to this embodiment is shown in section view. The original picture film holder 100 is a rectangular frame inside of which an opening 101 a little smaller size that of the original picture film is formed. Over the upper end at the inside edge thereof, there is provided a stepped portion 102 having the same thickness as that of the original picture film O. The original picture film O is held on the stepped portion 102 by supporting the film along the entire peripheral of the stepped portion.

Figure 20:
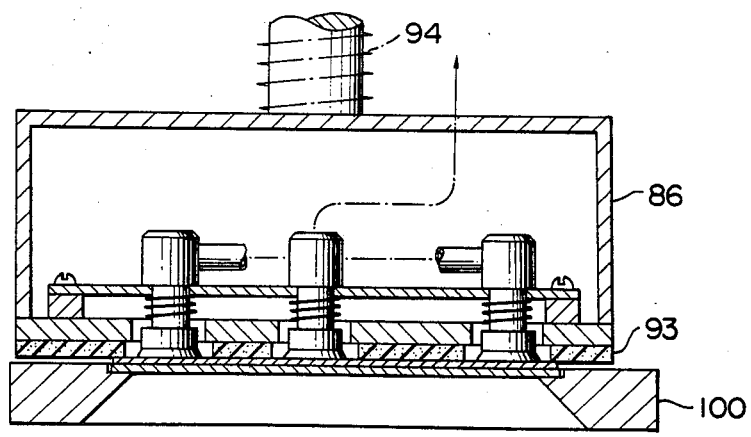
FIG. 20 shows the suction head which is in contact with the original picture film holder.

In FIG. 20 there is shown a view of the suction head 86 being lowered to closely contact the film J1 which is being suctioned and maintained by the suction head 86. Also, by means of the cushion 93 and the spring 94 mounted on the suction head 86, the film J1 and the original picture film O are pressed together. There is no supporting material such as a glass plate under the original film O, so that no Newton ring occurs. It is desirable to select the strength of the spring 94 so that it may keep the original film O from falling down from the original picture film holder H. The original film O is somewhat curved downwardly caused by being pressed from the upper direction, but all the peripheral edges are held by the stepped portion 102 of the original picture film holder H. Because of rigidity of the film base, it can sufficiently bear the load. Furthermore, the curve is quite small, and the thickness of the original film is very small, so that no distortion can occur in the resultant reproduced picture image.

Figure 21:
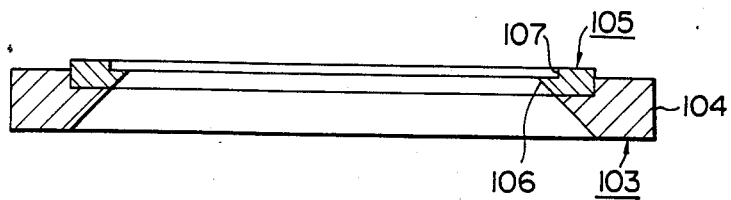
FIG. 21 is a sectional front view of the original picture film holder.
Figure 22:
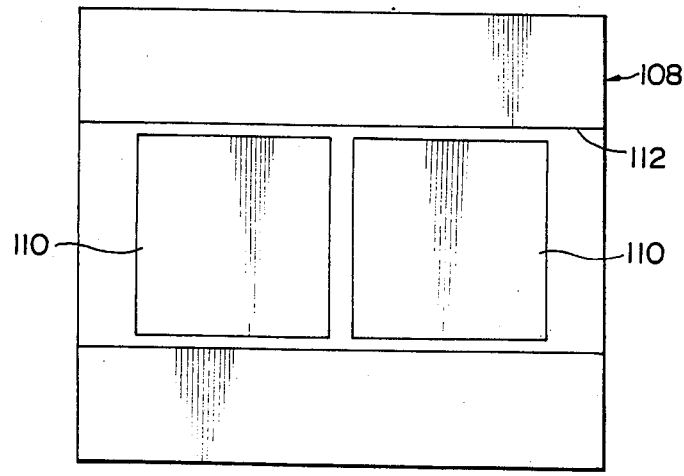
FIGS. 22 and 23 show an inner frame for the second component of the present invention.
Figure 23:
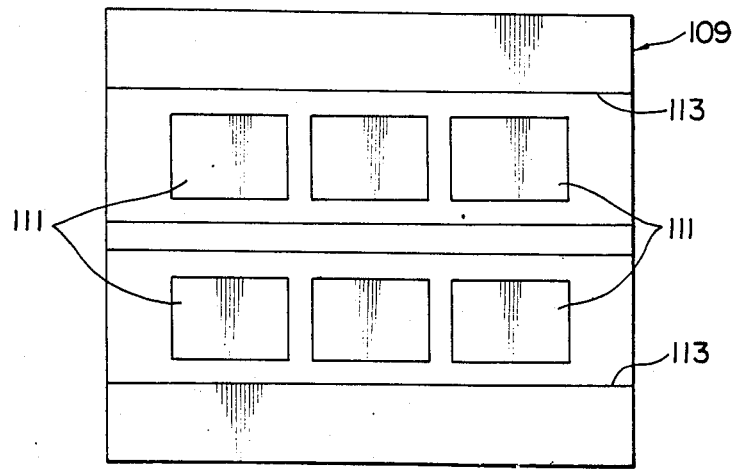

FIG. 21 shows a sectional view of another embodiment of the above-mentioned glassless original picture film holder 103. The original picture film holder 103 comprises an outer frame 104, and an inner frame 105 which is detachably fitted into the outer frame 104. In the outer frame 105 there is provided an opening 106. According to necessity, inner frame 105 can differ in size and a number of openings may be prepared for various kinds of original picture films. For example, the inner frame 105 shown in FIG. 21 is provided a relatively large opening (for example, for 4×5 inch film); and an inner frame 108 shown in FIG. 22 has two medium openings 110 (for example, for 6×6 cm roll film). In FIG. 23, there is shown an inner frame 109 in which six small openings 111 (for example, for 35 mm roll film) are formed. In the inner frames 108 and 109 the stepped portions 112 and 113 are formed so that they may adapt to hold the roll films.

The foregoing embodiments are considered as illustrative only of the principle of the present invention. Further, since numerous modifications and changes will readily occur to those persons skilled in the art, it is not desired to limit the invention to the exact constructions and operations shown and described, and accordingly, modifications and equivalents are possible that fall within the scope of the invention.

We claim:

1. A photographic contact printing apparatus for duplicating original picture films by closely contacting an original picture film with a photosensitive film and exposing it, comprising:
    a body completely light shielded in the inside thereof and accommodating the following means and members:
    a light projector adapted to project a light beam onto an exposure aperture set up in the body;
    a lifting case capable of being moved vertically above a plane including the exposure aperture and is adapted to acommodate a plurality of stacked original picture films;
    driving means for transporting said lifting case so that a desired original picture film among those accommodated in said lifting case are aligned above the plane of said exposure aperture;
    an original picture film transporting device which transports the original picture film aligned to the plane of said exposure aperture to a position directly over the exposure aperture and returns the original picture film to said lifting case after exposure is carried out, said original picture film transporting device being accommodated in said lifting case;
    a first tray for accommodating unexposed photosensitive films, said first tray being detachably mounted to said body;
    a second tray for accommodating exposed films, said second tray being detachably mounted to said body; and
    a film transporting device adapted to transport a sheet of unexposed photosensitive film from said first tray to a position on the original picture film set up over said exposure aperture and to transport the exposed photosensitive film from the position on the original picture film to said second tray;
    said original film transporting device comprising:
    a plurality of original picture film holders on each of which an original picture film is loaded, said plurality of original picture film holders being accommodated in said lifting case in a stacked manner and a selected one among said plurality of original picture film holders being aligned to a predetermined position by moving said lifting case;
    a pair of guide rails which guide said selected original film holder when said original film holder is transported between said lifting case and said exposure aperture;
    a film holder transporting device adapted to slide said selected film holder along said guide rails;
    connecting means disposed at a portion of said film holder transporting device which is opposite to said selected original picture holder for connecting said film holder transporting device with said selected original picture film holder, as occasion demands; and driving means for moving said film holder transporting device so that said selected original picture film holder connected to said film holder transporting device may be moved between said lifting case and said exposure aperture;

said driving means for said film holder transporting device comprising:

an axis mounted upright on said film holder transporting device;

a link lever having opposed first and second ends, said first end being capable of being swung in the same direction as that of the sliding direction of said transporting device, said second end forming a fork element pivotably connected to said axis; and pneumatic cylinder means having opposed ends, one of said ends being pivotally connected to an appropriate portion of said link lever and the other of said ends being pivotally connected to said link lever at an intermediate position between said first and second ends.

2. A photographic contact printing apparatus for duplicating original picture films by closely contacting an original picture film with a photosensitive film and exposing it, comprising:

a body completely light shielded in the inside thereof and accommodating the following means and members:

a light projector adapted to project a light beam onto an exposure aperture set up in the body;

a lifting case capable of being moved vertically above a plane including the exposure aperture and is adapted to accommodate a plurality of stacked original picture films;

driving means for transporting said lifting case so that a desired original picture film among those accommodated in said lifting case are aligned above the plane of said exposure aperture;

an original picture film transporting device which transports the original picture film aligned to the plane of said exposure aperture to a position directly over the exposure aperture and returns the original picture film to said lifting case after exposure is carried out, said original picture film transporting device being accommodated in said lifting case;

a first tray for accommodating unexposed photosensitive films, said first tray being detachably mounted to said body;

a second tray for accommodating exposed films, said second tray being detachably mounted to said body;

a film transporting device adapted to transport a sheet of unexposed photosensitive film from said first tray to a position on the original picture film set up over said exposure aperture and to transport the exposed photosensitive film from the position on the original picture film to said second tray;

said body having a front surface, said first and second trays being capable of being inserted into said body at said front surface;

a light-shield lid mounted on each of said first and second trays adapted to shield the inside of each said first and second tray from the light when said lid is closed; and closure means mounted in said body for opening and closing said light-shield lid of each said first and second tray, said closure means comprising:

said light shield lid having a rear end and a connecting block mounted at said rear end, said connecting block having an L-shaped opening;

a transporting device which reciprocally moves the distance equal to that between an open position at which said light shield lid opens and a closed position at which said light shield lid closes;

an engaging pin mounted on said transporting device, said engaging pin being capable of being in pressing relationship with said light-shield lid in alignment with said L-shaped opening of said connecting block when said transporting device moves in the direction to close said light-shield lid, said engaging pin also being capable of engaging with said L-shaped opening when said transporting device moves in the direction to open said light-shield lid; and driving means which transports said transporting device between said open and closed positions.

* * * * *